(12) United States Patent
Kaal

(10) Patent No.: US 9,167,035 B2
(45) Date of Patent: Oct. 20, 2015

(54) CONTACT INFORMATION IN A PEER TO PEER COMMUNICATIONS NETWORK

(75) Inventor: Madis Kaal, Tallinn (EE)

(73) Assignee: Skype, Dublin (IE)

( * ) Notice: Subject to any disclaimer, the term of this patent is extended or adjusted under 35 U.S.C. 154(b) by 428 days.

(21) Appl. No.: 12/640,928

(22) Filed: Dec. 17, 2009

(65) Prior Publication Data

US 2011/0113149 A1 May 12, 2011

(30) Foreign Application Priority Data

Nov. 10, 2009 (GB) .................................. 0919674.2

(51) Int. Cl.
| | | |
|---|---|---|
| G06F 15/16 | (2006.01) | |
| H04L 29/08 | (2006.01) | |
| G06Q 50/00 | (2012.01) | |
| H04L 29/12 | (2006.01) | |
| H04L 12/58 | (2006.01) | |
| H04L 29/06 | (2006.01) | |

(52) U.S. Cl.
CPC .............. *H04L 67/104* (2013.01); *G06Q 50/01* (2013.01); *H04L 51/32* (2013.01); *H04L 61/1594* (2013.01); *H04L 63/00* (2013.01)

(58) Field of Classification Search
CPC ... H04L 67/104; H04L 61/1594; H04L 51/32; H04L 63/00; G06Q 50/01
See application file for complete search history.

(56) References Cited

U.S. PATENT DOCUMENTS

| | | |
|---|---|---|
| 6,064,736 A | 5/2000 | Davis et al. |
| 8,363,961 B1 | 1/2013 | Avidan et al. |

(Continued)

FOREIGN PATENT DOCUMENTS

| | | |
|---|---|---|
| GB | 2475251 | 5/2011 |
| GB | 2475252 | 5/2011 |

(Continued)

OTHER PUBLICATIONS

Notification of Transmittal of the International Search Report and the Written Opinion of the International Searching Authority, or the Declaration from International Application No. PCT/EP2010/067209, Date of Mailing: Feb. 8, 2011, 9 pp.

(Continued)

*Primary Examiner* — Hieu Hoang
*Assistant Examiner* — Nam Tran
(74) *Attorney, Agent, or Firm* — Danielle Johnston-Holmes; Micky Minhas

(57) ABSTRACT

In one embodiment, a method of transmitting contact data in a peer to peer communications network includes transmitting a list of contacts from a first contact store to a first compare means. At the first compare means, the list of contacts from the first contact store is compared with a list of contacts from a second contact store to identify common contacts between the lists of contacts from the first and second contact stores, the first compare means outputting a contacts result based on the identification of the common contacts. At a second compare means, the contacts result output from the first compare means is compared with a list of contacts from a third contact store. An output of the second compare means is used to identify at least one contact to recommend as a new contact to a recommendee user in the network. The first contact store is at a node of the network and the first compare means is at another node of the network, and the list of contacts transmitted from the first contact store is transmitted over the network to the first compare means.

24 Claims, 10 Drawing Sheets

(56) References Cited

U.S. PATENT DOCUMENTS

| | | | |
|---|---|---|---|
| 8,874,536 B2 | 10/2014 | Kaal | |
| 2004/0148506 A1 | 7/2004 | Prince | |
| 2005/0234901 A1 | 10/2005 | Caruso | |
| 2006/0004789 A1* | 1/2006 | Lunt et al. | 707/100 |
| 2006/0190536 A1* | 8/2006 | Strong et al. | 709/204 |
| 2007/0150948 A1 | 6/2007 | De Spiegeleer | |
| 2007/0294243 A1 | 12/2007 | Caruso | |
| 2008/0059576 A1 | 3/2008 | Liu et al. | |
| 2009/0070684 A1 | 3/2009 | Aldrich et al. | |
| 2009/0319288 A1* | 12/2009 | Slaney et al. | 705/1 |
| 2009/0319466 A1* | 12/2009 | Liu et al. | 706/54 |
| 2010/0057732 A1* | 3/2010 | O'Sullivan et al. | 709/206 |
| 2010/0106713 A1 | 4/2010 | Esuli et al. | |
| 2010/0191844 A1* | 7/2010 | He et al. | 709/224 |
| 2011/0113029 A1 | 5/2011 | Kaal | |
| 2011/0113149 A1 | 5/2011 | Kaal | |
| 2015/0046466 A1 | 2/2015 | Kaal et al. | |

FOREIGN PATENT DOCUMENTS

| | | |
|---|---|---|
| WO | WO 2007/106791 A2 | 9/2007 |
| WO | WO-2007106791 | 9/2007 |
| WO | WO 2008/041173 A2 | 4/2008 |
| WO | WO-2008041173 | 4/2008 |
| WO | WO-2011058056 | 5/2011 |
| WO | WO-2011058057 | 5/2011 |

OTHER PUBLICATIONS

Search Report, dated Mar. 7, 2011, for Application No. GB0919674.2, 1 pp.

Chiou, S., et al., "Common Friends Discovery with Privacy and Authenticity," *2009 Fifth International Conference on Information Assurance and Security*, pp. 337-340 (2009).

Von Arb, M., et al., "VENETA: Serverless Friend-of-Friend Detection in Mobile Social Networking," *IEEE International Conference on Wireless & Mobile Computing, Networking & Communication*, pp. 184-189 (2008).

Bittorrent Protocol Specification v1.0, Sep. 12, 2006, available at http://wiki.theory.org/index.php?title=BitTorrentSpecification&oldid=4760.

SHA-1, Dec. 13, 2011, in Wikipedia, The Free Encyclopedia, retrieved Dec. 19, 2011, from http://en.wikipedia.org/w/index.php?title=SHA-1&oldid=465712769.

MD5, Dec. 16, 2011, inWikipedia, The Free Encyclopedia, retrieved Dec. 19, 2011 from http://en.wikipedia.org/w/index.php?title=MD5&oldid=466201982.

"Bittorrent Protocol Specification v1.0", available at http://wiki.theory.org/BitTorrentSpecification, (Sep. 12, 2006), 33 pages.

"International Search Report and Written Opinion", Application No. PCT/EP2010/067210, (Apr. 1, 2011), 13 pages.

"MD5. (Dec. 16, 2011). In Wikipedia, The Free Encyclopedia", Retrieved 17:00, Dec. 19, 2011, from http://en.wikipedia.org/w/index.php?title=MDF&oldid=466201982, (Dec. 16, 2011), 10 pages.

"Non-Final Office Action", U.S. Appl. No. 12/640,844, (Dec. 23, 2011), 8 pages.

"Search Report", Application No. GB0919675.9, (Mar. 9, 2011), 1 page.

"SHA-1. (Dec. 13, 2011) in Wikipedia, The Free Encyclopedia", Retrieved 17:00, Dec. 19, 2011, from http://en.wikipedia.org/w/index.php?title=SHA-1&oldid=465712769, (Dec. 13, 2011), 11 pages.

Chiou, Shin-Yan et al., "Common Friends Discovery with Privacy and Authenticity", *2009 Fifth International Conference on Information Assurance and Security*, (2009), pp. 337-340.

Von Arb, Marco et al., "VENETA: Serverless Friend-of-Friend Detection in Mobile Social Networking", *IEEE International Conference on Wireless & Mobile Computing, Networking & Communication*, (2008), 6 pages.

"Advisory Action", U.S. Appl. No. 12/640,844, (Aug. 14, 2012), 3 pages.

"Final Office Action", U.S. Appl. No. 12/640,844, (Jun. 18, 2012), 9 pages.

"Notice of Allowance", U.S. Appl. No. 12/640,844, Jun. 25, 2014, 8 pages.

"Foreign Notice of Allowance", EP Application No. 10774235.5, Jan. 28, 2015, 7 pages.

\* cited by examiner

CONTACT INFORMATION IN A PEER TO PEER COMMUNICATIONS NETWORK

RELATED APPLICATION

This application claims priority under 35 U.S.C. §119 or 365 to Great Britain, Application No. 0919674.2 filed Nov. 10, 2009. The entire teachings of the above application are incorporated herein by reference.

TECHNICAL FIELD

This invention relates to contact information in a peer to peer communications network.

BACKGROUND

Packet-based communication systems allow the user of a device, such as a personal computer, to communicate across a computer network such as the Internet.

One type of packet-based communication system uses a peer-to-peer ("P2P") topology built on proprietary protocols. A P2P network is a mesh of interconnected communications nodes that communicate with each other. In contrast with a classical client-server approach a pure P2P network does not have central servers. Instead, all participating P2P nodes run software that provides various services to other nodes in the network, in addition to giving access to provided services. Such services may include a distributed database service for maintaining information for finding other nodes in the network, or a traffic relaying service to enable connectivity between nodes that cannot communicate directly. Typically, the pure P2P mesh is often accompanied by central servers for certain services, like user authentication or central data storage backup.

One advantage of P2P networks compared to client-server architecture is that of scalability. Participating nodes themselves provide the bandwidth, storage, and CPU resources, so adding more clients also increases the availability of these resources. In pure P2P networks where there are no central servers, there is an additional benefit of not having a single point of failure or performance bottleneck in a system.

In P2P networks that provide direct services to users, each user of the P2P system typically has a unique username which is used to identify the user in the network. It is usual for a user of the P2P system to have a contact list which stores details (including the username) of other users in the P2P system with whom the user communicates. These other users are referred to as the user's "contacts". The contact list allows the user to initiate a communication event with a contact in a simple manner, for example by clicking on the contact's name in the contact list. The contact list is typically kept on a P2P node, but the operator of the P2P service may also provide a central service for backing up the contact list for purposes of disaster recovery, or synchronization between different P2P nodes that the user uses.

Where the user intends to add a contact to his contact list it can sometimes be difficult for the user to find the username of the intended contact in the P2P system, particularly if the username of the intended contact is different to the intended contact's real name. This may be because the intended contact has willingly chosen a username in the P2P system that is different to their real name. However, in P2P systems such as Skype®, which have a large number of users (for example millions of users), it is highly likely that multiple users will share the same real name. Since usernames in the P2P system are required to be unique, some users will necessarily be forced to have usernames that are different to their real names. Therefore finding intended contacts becomes increasingly difficult as the number of users in the P2P system increases, and the number of users whose usernames are different from their real names correspondingly increases.

In such large systems it is beneficial for the system to use an automated searching facility to search for, and recommend to the user, other users in the system that the user may want to add as contacts to his contact list. It would be beneficial to optimize the automated searching facility in terms of at least one of the speed of the search; the processing resources required; and the relevance of the recommended contacts.

A Friends of Friends search is a known concept which uses the observation that if someone is a mutual friend of your friends then that someone is likely to also be your friend. The terms "friend" and "contact" can be used somewhat interchangeably in the context of the P2P system; in terms of a P2P system such as that described above, someone can be considered a friend of the user if they are a contact of the user. There exists a level of trust between users in the P2P communication system who are contacts (or friends), such that contacts are able to file transfer data between one another over the P2P system and are able to view each other's private details. The Friends of Friends search requires an examination of the contact lists of some or all of a user's friends in order to identify mutual friends of the user's friends. The number of database operations required to implement the Friends of Friends search increases as the number of users in the system increases and as the size of the contact lists increase. In P2P systems, such as Skype®, which have a large number of users (for example millions of users) applying the conventional Friends of Friends search to the central database holding the contact lists for the users requires a large amount of processing power and becomes prohibitively resource-hungry to the extent that it becomes unfeasible to apply the conventional Friends of Friends search to a P2P system having such a large number users.

There is therefore a need for an efficient technique for analysing existing relationships between users of a large P2P system (having for example millions of users) and for performing a search for mutual friends in the contact lists of users who are friends in a large P2P system. Such a technique would provide a feasible method of generating a list of mutual friends of friends in a large P2P system which can be used for recommending new contacts to a user in the P2P system.

SUMMARY

Embodiments of the invention are beneficial to users of the P2P system in that they provide a feasible way to recommend new contacts to a user in a large P2P system that are mutual contacts of contacts in the network. The addition of new contacts to a user's contact list is facilitated, which will generally mean that users have a larger number of contacts in their contact lists. This can also be beneficial to the operators of the P2P communications system because in general the number of contacts in a user's contact list determines the volume of communication of the user over the P2P network. More communication over the P2P network will often result in more revenue for the operators of the P2P system.

There is provided an efficient method for suggesting relevant new contacts to a user in a large P2P system (having for example millions of users), based on existing relationships between users of the system. The inventor has realised that a simplified version of a Friends of Friends search is possible in a P2P network which exploits the intrinsic structure of the P2P network. The search does not rely on performing database operations on a central database of the P2P system. Instead the search and compare operations are offloaded to the individual P2P nodes such that the search can be carried out in a parallel manner on the P2P nodes. Since only a fraction of the total database operations are carried out on a single P2P node, the search is very inexpensive to perform on each of the P2P nodes, in terms of the consumption of resources at each P2P node.

The invention also solves an important privacy issue related to such a search. P2P nodes in the system are not controlled by a central authority, and each node has access to data that is stored on the node. Therefore a node must not provide data to other nodes that would create a potential privacy or security hazard.

According to a first aspect of the invention there is provided a method of transmitting contact data in a peer to peer communications network, the method comprising: transmitting a list of contacts from a first contact store to a first compare means; at the first compare means, comparing the list of contacts from the first contact store with a list of contacts from a second contact store to identify common contacts between the lists of contacts from the first and second contact stores, the first compare means outputting a contacts result based on the identification of the common contacts; at a second compare means, comparing the contacts result output from the first compare means with a list of contacts from a third contact store; and using an output of the second compare means to identify at least one contact to recommend as a new contact to a recommendee user in the network, wherein the first contact store is at a node of the network and the first compare means is at another node of the network, and the list of contacts transmitted from the first contact store is transmitted over the network to the first compare means.

According to a second aspect of the invention there is provided a peer to peer communications network comprising: a first contact store configured to transmit a list of contacts over the network; a second contact store; a third contact store; first compare means configured to receive the list of contacts transmitted from the first contact store and to compare the list of contacts with a list of contacts from the second contact store to identify common contacts between the lists of contacts from the first and second contact stores, the first compare means further configured to output a contacts result based on the identification of the common contacts; and second compare means configured to compare the contacts result output from the first compare means with a list of contacts from the third contact store; wherein an output of the second compare means is used to identify at least one contact to recommend as a new contact to a recommendee user in the network, and wherein the first contact store is at a node of the network and the first compare means is at another node of the network, and the list of contacts transmitted from the first contact store is transmitted over the network to the first compare means.

In a first embodiment the first contact store is at a first node in the network, the first node being usable by the recommendee user, the second contact store is at a second node in the network, the third contact store is at a third node in the network, the first compare means is at the second node, the second compare means is at the third node, and wherein the contacts result output from the first compare means comprises a plurality of contacts which are contacts in the second contact store which are not contacts in the first contact store, the contacts result being transmitted over the network from the second node to the second compare means at the third node, and wherein the output of the second compare means is a list of contacts which are common contacts of the second and third contact stores but which are not contacts in the first contact store.

In a second embodiment the first contact store is at a second node in the network, the second contact store is at a third node in the network, the third contact store is at a first node in the network, the first node being usable by the recommendee user, the first compare means is at the third node, the second compare means is at the first node, and wherein the contacts result output from the first compare means comprises a plurality of contacts which are common contacts of the first and second contact stores, the common contacts of the first and second contact stores being transmitted over the network from the third node to the second compare means at the first node via the second node, and wherein the output of the second compare means is a list of contacts which are common contacts of the first and second contact stores but which are not contacts in the third contact store.

In a third embodiment the first contact store is at a third node in the network, the second contact store is at a second node in the network, the third contact store is at a first node in the network, the first node being usable by the recommendee user, the first compare means is at the second node, the second compare means is at the first node, and wherein the contacts result output from the first compare means comprises a plurality of contacts which are common contacts of the first and second contact stores, the common contacts of the first and second contact stores being transmitted over the network from the second node to the second compare means at the first node, and wherein the output of the second compare means is a list of contacts which are common contacts of the first and second contact stores but which are not contacts in the third contact store.

In a fourth embodiment the first contact store is at a third node in the network, the second contact store is at a second node in the network, the third contact store is at a first node in the network, the first node being usable by the recommendee user, the first compare means is at the second node, the second compare means is at the second node, and wherein the contacts result output from the first compare means comprises a plurality of contacts which are common contacts of the first and second contact stores, and wherein the first node is configured to transmit a list of contacts of the third contact store over the network to the second compare means at the second node, and wherein the output of the second compare means is a list of contacts which are common contacts of the first and second contact stores but which are not contacts in the third contact store.

In preferred embodiments common contacts are identified in contact lists of users without revealing the true identities of contacts of any P2P user to other P2P nodes in the P2P network. Instead of contact identities an identifier of the contact is used to find common contacts. The identifier may be a one-way hash function of contact identity, the hash function being chosen in such a way that it allows a reliable determination of common contacts without revealing the name of the contact to a node of a user that does not have the contact name in contact list.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
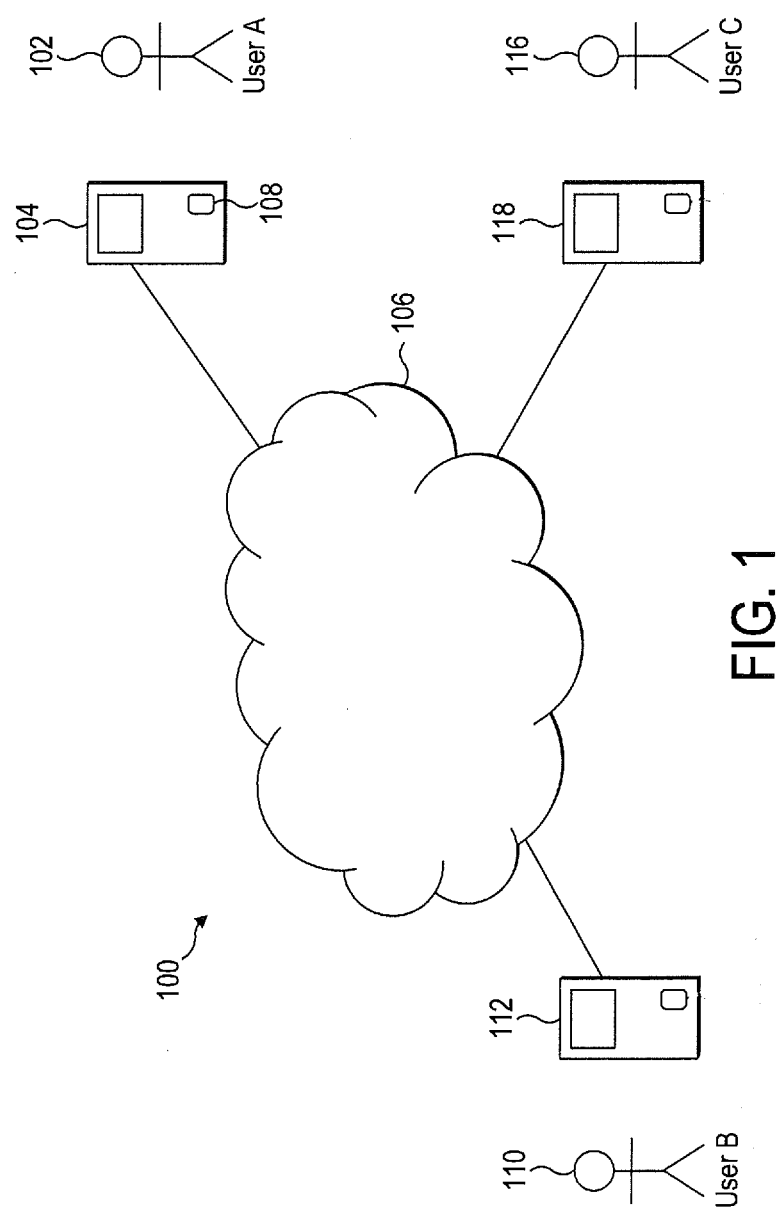
FIG. 1 shows a P2P network built on top of packet-based communication system.

Reference is first made to FIG. 1, which illustrates a packet-based P2P communication system 100. A first user of the communication system (User A 102) operates a user terminal 104, which is shown connected to a network 106. Note that the communication system 100 utilises a network such as the Internet. The user terminal 104 may be, for example, a mobile phone, a personal digital assistant ("PDA"), a personal computer ("PC") (including, for example, Windows™, Mac OS™ and Linux™ PCs), a gaming device or other embedded device able to connect to the network 106. The user device 104 is arranged to receive information from and output information to a user 102 of the device. In a preferred embodiment the user device 104 comprises a display such as a screen and an input device such as a keypad, joystick, touch-screen, keyboard and/or mouse. The user device 104 is connected to the network 106.

Note that in alternative embodiments, the user terminal 104 can connect to the communication network 106 via additional intermediate networks not shown in FIG. 1, For example, if the user terminal 104 is a mobile device, then it can connect to the communication network 106 via a cellular mobile network (not shown in FIG. 1), for example a GSM or UMTS network.

The user terminal 104 is running a communication client 108, provided by the software provider. The communication client 108 is a software program executed on a local processor in the user terminal 104.

Figure 2:
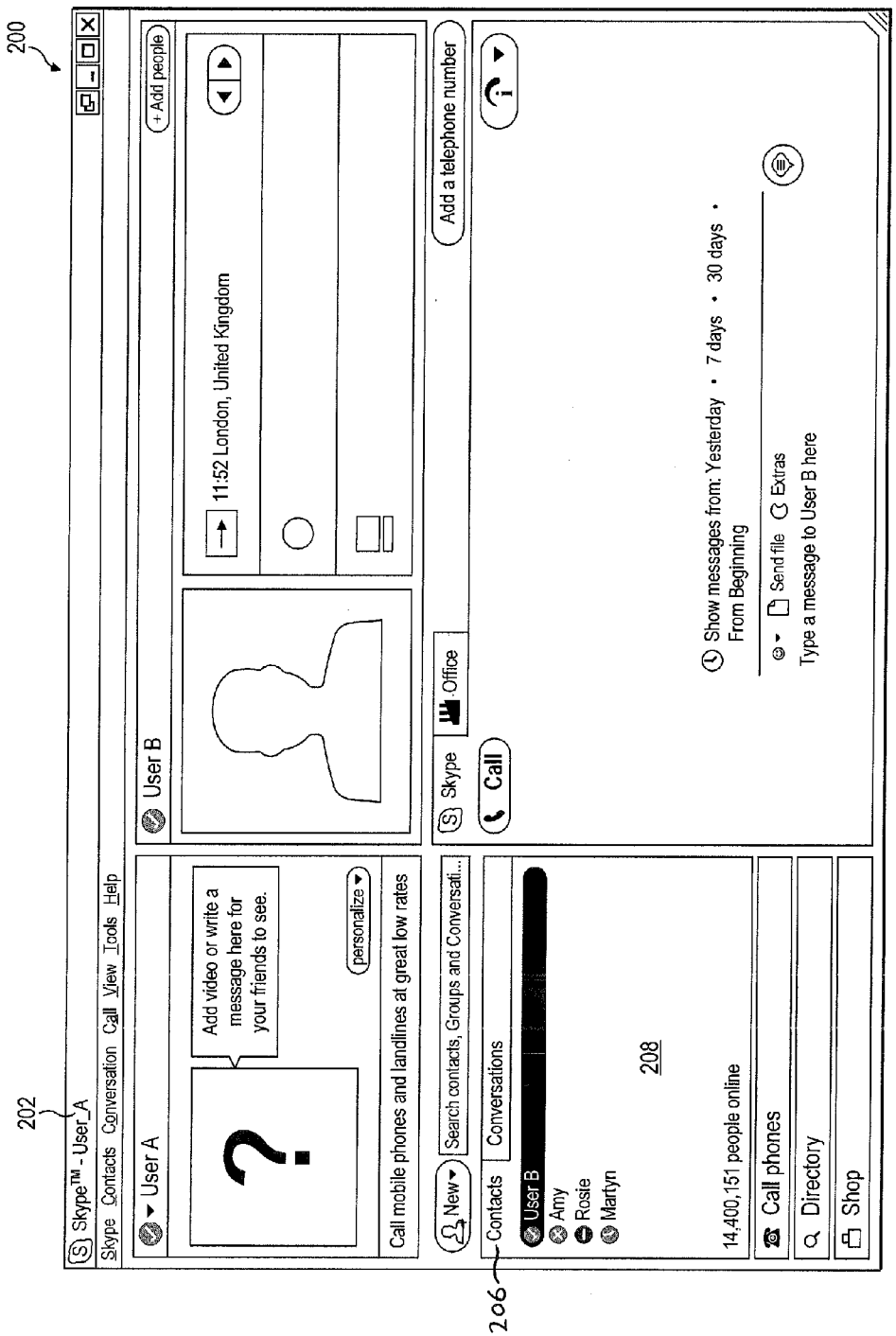
FIG. 2 shows a first user interface of a communication client.

An example of a user interface 200 of the communication client 108 executed on the user terminal 104 of the first user 102 is shown illustrated in FIG. 2. Note that the user interface 200 can be different depending on the type of user terminal 104. For example, the user interface can be smaller or display information differently on a mobile device, due to the small screen size. In the example of FIG. 2, the client user interface 200 displays the username 202 of "User A" 102 in the communication system.

The client user interface 200 comprises a tab 206 labelled "contacts", and when this tab is selected the contacts stored in User A's contact list are displayed in a pane 208 below the tab 206. In the example user interface in FIG. 2, four contacts of other users of the communication system are shown listed in pane 208. Each of these contacts have authorised User A 102 of the client 108 to view their contact details.

Figure 3:
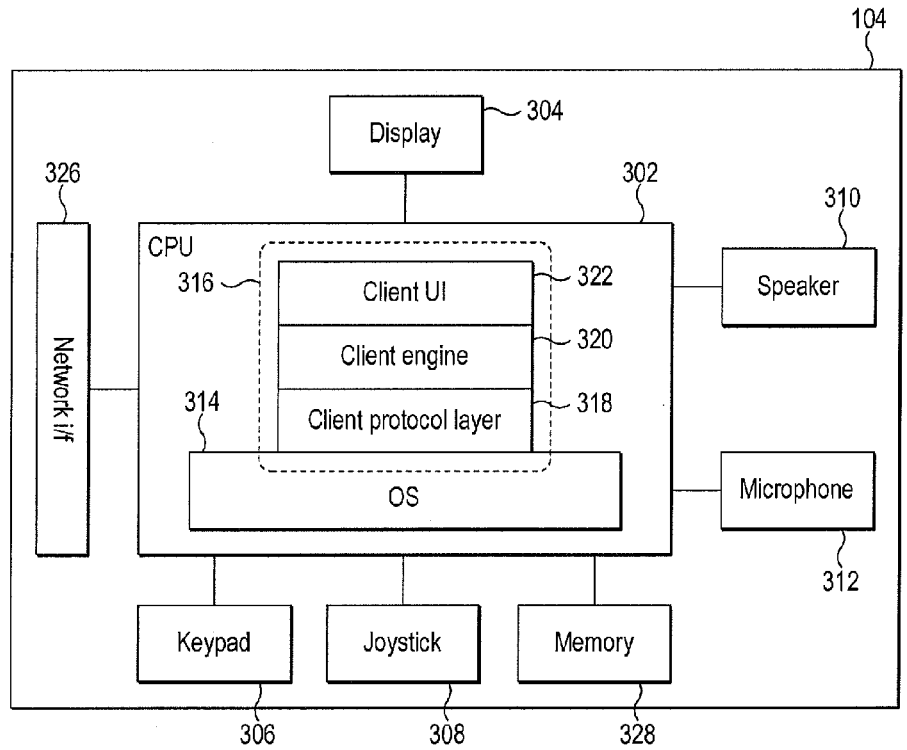
FIG. 3 shows a user terminal executing a communication client.

FIG. 3 illustrates a detailed view of the user terminal 104 on which is executed client 108. The user terminal 104 comprises a central processing unit ("CPU") 302, to which is connected a display 304 such as a screen, input devices such as a keypad (or a keyboard) 306 and a pointing device such as a joystick 308. The display 304 may comprise a touch screen for inputting data to the CPU 302. An output audio device 310 (e.g. a speaker) and an input audio device 312 (e.g. a microphone) are connected to the CPU 302. The display 304, keypad 306, joystick 308, output audio device 310 and input audio device 312 are integrated into the user terminal 104. In alternative user terminals one or more of the display 304, the keypad 306, the joystick 308, the output audio device 310 and the input audio device 312 may not be integrated into the user terminal 104 and may be connected to the CPU 302 via respective interfaces. One example of such an interface is a USB interface. A pointing device such as a mouse (not shown) may be connected to the CPU 302 via an interface (not shown). The CPU 302 is connected to a network interface 326 such as a modem for communication with the network 106. The network interface 326 may be integrated into the user terminal 104 as shown in FIG. 3. In alternative user terminals the network interface 326 is not integrated into the user terminal 104.

FIG. 3 also illustrates an operating system ("OS") 314 executed on the CPU 302. Running on top of the OS 314 is a software stack 316 for the client 108. The software stack shows a client protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 326. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Figure 4:
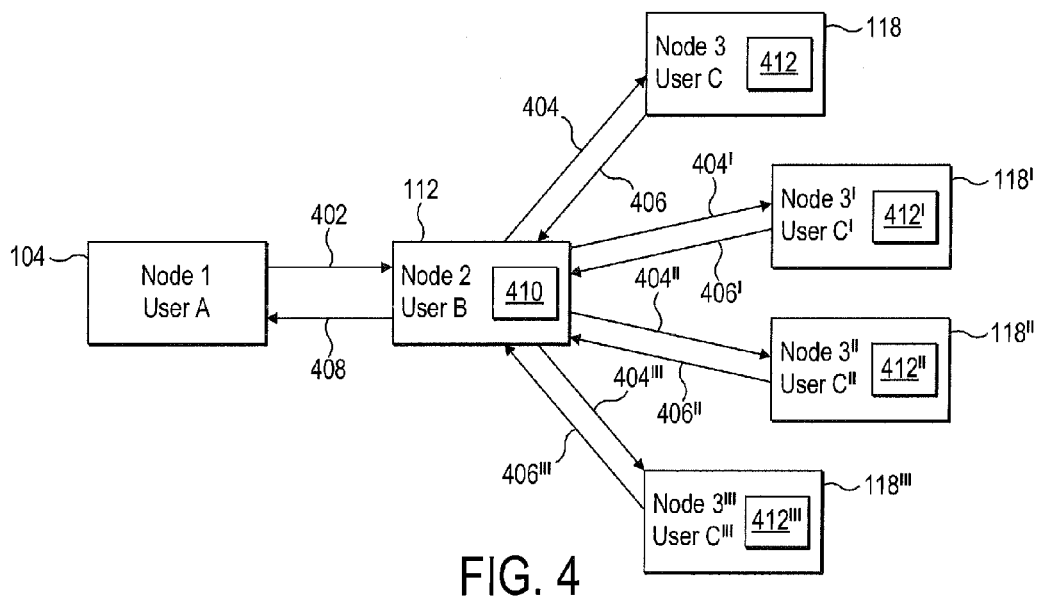
FIG. 4 is a schematic diagram of a peer to peer network according to a preferred embodiment.
Figure 5:
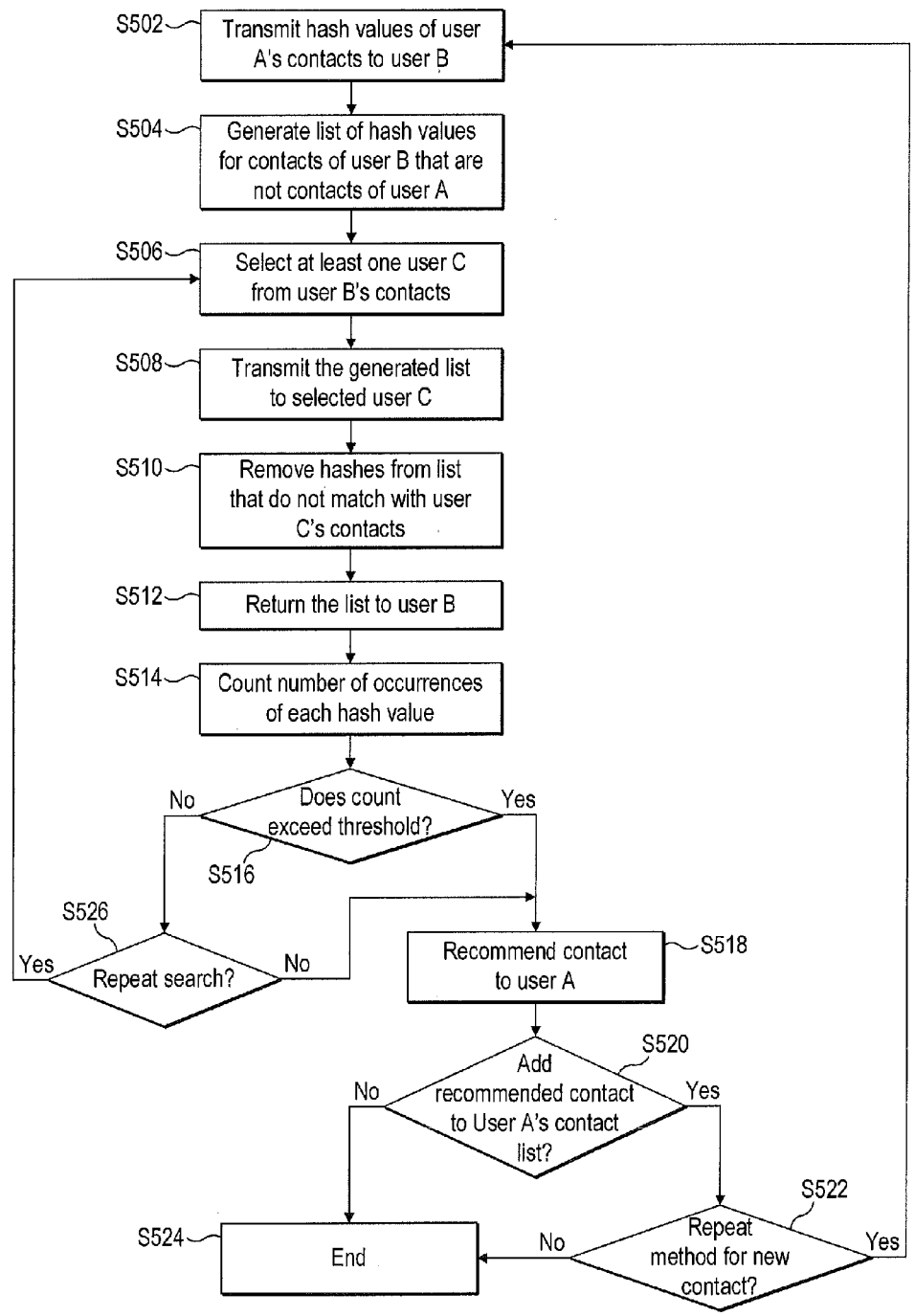
FIG. 5 shows a flowchart of a process for recommending a new contact to a user of the P2P system according to the preferred embodiment.

With reference to FIGS. 4 and 5 a preferred embodiment is now described. The method steps (S502 to S524) shown in FIG. 5 and described below can be implemented using functional blocks of the nodes shown in FIG. 4. The functional blocks can be implemented as either hardware blocks or software blocks as appropriate to achieve the functions described below in relation to the method steps of FIG. 5. As shown in FIG. 4, User A 102 is logged into node 1 corresponding to user terminal 104 shown in FIG. 1 and User B 110 is logged into node 2 corresponding to user terminal 112 shown in FIG. 1. User B has a number of contacts in the P2P system including Users C (116), C', C" and C'" who are logged into nodes 3, 3', 3" and 3'" respectively. Nodes 3, 3', 3" and 3'" correspond to user terminal 118 shown in FIG. 1. All of the nodes shown in FIG. 4 are capable of communicating with each other over the network 106. Comparing means 410 is located at node 2 and comparing means 412, 412', 412" and 412'" are located at nodes 3, 3', 3" and 3'" respectively.

Privacy is an important issue in P2P systems because the communication in the P2P network 106 is controlled by the users of the system, not by a centralized network operator. User A creates hash values indicating the usernames of the contacts stored in User A's contact list. The hash values are sent between the nodes rather than the usernames of the contacts indicated by the hash values, such that User A avoids the need to reveal the usernames of his contacts to User B, and User B likewise avoids the need to reveal usernames of his contacts to Users C, C', C" and C'".

A one-way hashing algorithm is used to convert the usernames of the contacts into the hash values, with the length of the resulting hash chosen so that the total number of possible unique hash values is far less (e.g. at least an order of magnitude less) than the total number of users in the P2P system. The hash values thus collide heavily across the entire set of usernames in the P2P system, such that one hash value can indicate more than one username in the P2P system. However, as each user in the P2P system has much fewer contacts than the total number of users in the P2P network, the length of a hash is chosen so that the total number of unique hash values is significantly larger than the total number of unique contact names in contact lists of Users A, B, and all of Users C, C', C" and C'".

In this way, although each unique hash value indicates more than one username in the whole P2P network, it is unlikely that a unique hash value will indicate the username of more than one contact of Users A,B, and all of Users C, C', C" and C'". For example, the total number of users in the P2P system could be three hundred million, whereas the total number of contacts of Users A,B, and all of Users C, C', C" and C'" in the system could be one hundred. An example of a useful hashing scheme in this case is a 16-bit CRC which has a total key space of 65,536, i.e. there are 65,536 unique hash values which can be used to indicate the usernames. In this example each unique hash value would indicate an average of 4500 usernames in the entire P2P system, but it is unlikely that the username of more than one of the 100 contacts will be indicated by a single hash value.

This method of indicating contact names allows a key for allowing a Friends of Friends search to be executed on P2P nodes without revealing the contact names between P2P nodes that are participating in the search, while still allowing the identification of shared contacts.

Referring to FIG. 5, in step S502 User A sends a list of hash values, calculated as described above, of the usernames of its contacts from node 1 (104) to node 2 (112) over the network 106 using the link 402. The hash of User A's username may be included in the list of hash values that are sent to node 2 (112), or alternatively node 2 may add the hash value of the username of user A to the list as node 2 knows the username of the user communicating from node 1. The step S502 may be initiated when User A adds User B (at node 2) as a contact. Alternatively, User A can initiate the method with step S502 at any time, independent of the actions associated with adding User B as a contact.

In step S504, comparing means 410 on node 2 (112) of User B determines a list of hash values of usernames in User B's contact list, and removes from that list the hash values that were received from node 1 (104) in step S502, with the hash value of User A's username included. In this way, a list is generated at node 2 of hash values which indicate usernames of contacts of User B which are not contacts of User A, and which do not indicate User A itself A hash value indicating the username of User B is then added to the generated list to avoid recommending User B himself, as the User A already communicates with User B, meaning that User A already knows User B. The hash of User B's username can be added on node 2, or node 3.

In step S506 a number of contacts from User B's contact list are selected. In the example shown in FIG. 4 four of User B's contacts are selected, the selected contacts being User C at node 3 (118), User C' at node 3' (118'), User C" at node 3" (118") and User C'" at node 3'" (118'"). At least one of User B's contacts has to be selected, such as User C, but normally more than one of User B's contacts are selected, such as Users C, C', C" and C'" as shown in FIG. 4.

In step S508 a query is sent from node 2 (112) to nodes 3 (118, 118', 118", 118'") of each of the contacts selected in step S506 over the P2P network 106 using a respective link (404, 404', 404", 404'"). The query includes the list of the hash values indicating usernames of contacts of User B which are not contacts of User A generated at node 2 in step S504.

In step S510 comparing means 412 at node 3 removes hash values from the list, which do not indicate usernames of contacts of User C. This results in the list only including hash values which indicate usernames of contacts of User B that are also contacts of User C, but which are not already contacts of User A.

In step S512 the list of hash values is returned to node 2 from node 3 over the P2P system using the link 406.

Steps S510 and S512 are also carried out at nodes 3', 3" and 3'" for users C', C" and C'" respectively. Therefore, as well as receiving a list of hash values on link 406 indicating usernames of mutual contacts of Users B and C that are not contacts of User A, node 2 also receives a list of hash values over the P2P system on link 406' indicating usernames of mutual contacts of Users B and C' that are not contacts of User A, and a list of hash values over the P2P system on link 406" indicating usernames of mutual contacts of Users B and C" that are not contacts of User A, and a list of hash values over the P2P system on link 406'" indicating usernames of mutual contacts of Users B and C'" that are not contacts of User A. In step S510 each of the selected nodes (nodes 3, 3', 3" and 3'") compares the list of hash values received from node 2 against the usernames of contacts in its own respective contact list, without considering the contact lists of other users. In this way the contact lists of the selected users are searched in parallel, and only N hash calculations and compare operations are needed on each selected node where N is the number of contacts in the selected user's contact list. This makes the method very scalable for use in large P2P systems having for example millions of users because the amount of processing needed is not related to total number of users in a system, and is in fact only proportional to the size of the contact lists of users participating in the search.

When the lists are received at node 2 from the selected nodes 3, 3', 3" and 3'" the number of occurrences of each unique hash value in all of the received hash lists is counted in step S514. If a hash value appears in one of the lists then this suggests that a contact with a username indicated by that hash value is a mutual friend of User B and one of the selected users (User C, C', C" or C'"). If a hash value appears in more than one of the lists then this suggests that a contact with a username indicated by that hash value is a mutual friend of User B and more than one of the selected users (User C, C', C" or C'"). Such recurring hash values indicate usernames of contacts that could be recommended as new contacts for User A. We note that the occurrence of the hash values in the returned lists is only a suggestion of mutual friendship, rather than conclusive proof of mutual friendship, because, as described above, each unique hash value may indicate more than one user in the P2P system. However, the likelihood that two contacts of any of the users A, B, C, C', C" and C'" have usernames indicated by the same hash value is small so the suggestion of mutual friendship is a reliable suggestion.

It can be assumed that the greater the number of occurrences of a particular hash value in the lists received at node 2 from the selected nodes, the greater is the certainty that the contact indicated by this hash value is a friend of User A. This is because a large number of occurrences of a hash value indicates that a large number of the selected contacts are mutual friends with the contact having the username indicated by that hash value.

In step S516 the number of occurrences of each hash value is compared to a threshold value. The threshold value can be any number which does not exceed the number of selected users (Users C, C', C", C'"), as the number of occurrences of hash value cannot exceed the number of lists returned from nodes 3, 3', 3" and 3'" to node 2. In the example shown in FIG. 4, the threshold value cannot exceed four, but can take any value from one to four. For example the threshold may be two.

If the number of occurrences of a hash value exceeds the threshold value then the contact with a username indicated by that hash value can be taken to be a mutual friend of User B and at least some of the selected users C, C', C" and C'". In this event, the method can continue to step S518 in which the contacts that are mutual friends of User B and at least some of the selected Users C, C', C" and C'" can be recommended to User A as new contacts. Node 3 may optionally ask User B to approve sending all or some of the contact names to User A as recommendations. The recommendations may be sent to node 1 over the P2P network 106 using the link 408.

It is worth noting that any contact that is recommended to User A using the method described above is necessarily a contact of User B. Therefore details of the recommended contact are stored in User B's contact list and node 2 may include additional information that is considered public information in the contact list which may be transmitted with the recommendation to User A. Node 2 (112) may automatically retrieve and send these additional details to User A with the recommendation on link 408. Node 2 must not include any information about contacts that is considered private, as the permission to see private information must be granted to User A by a contact himself.

Figure 6:
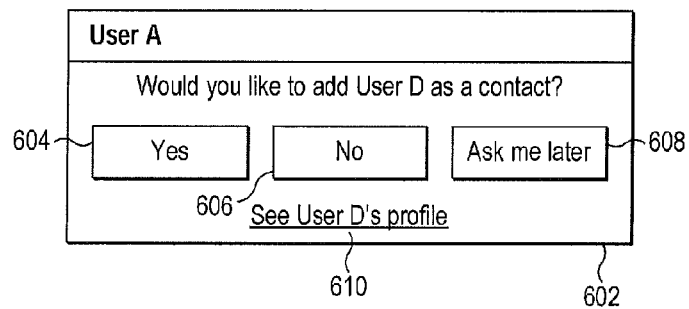
FIG. 6 shows a second user interface of a communication client.

The recommended contacts are received at node 1 (104) and can be presented to User A. In step S520 User A can decide to add the recommended contact as a new contact to his contact list. Since the recommended contact is a mutual friend of User B and at least one of the selected users (e.g. Users C, C', C" and C'") it is likely that the recommended contact is also a friend of User A. FIG. 6 shows an example of a user interface 602 that may be used to ask User A whether he would like to add the recommended contact (e.g. User D) to his contact list. More than one contact may be recommended to User A, but in the example shown in FIG. 6, only User D has been recommended. User A can choose to add contact D to his contact list by clicking on button 604. User A can choose not to add contact D to his contact list by clicking on button 606. If User A is unsure whether to add User D as a contact, or does not currently have time to decide whether to add User D as a contact, then he can click on button 608 which instructs the client 108 to ask User A whether he would like to add User D as a contact at some later time. Clicking on button 608 will close the user interface 602, but the user interface 602 will reopen at some later time (e.g. 24 hours later) to ask User A again whether he would like to add User D as a contact.

As described above, details about the recommended contact (e.g. User D) can be transmitted from node 2 to node 1 when the contact is recommended. Alternatively only contact names can be transferred, and node 1 can retrieve the additional publicly available details from either a P2P distributed database, or central database holding details of users. These details can help User A to decide whether to add the recommended user as a contact. These details may be displayed in the user interface 602. Alternatively, as shown in FIG. 6 the user interface 602 may include a link 610, such that when User A clicks on the link 610, the details regarding User D are displayed.

If User A decides to add the recommended user as a new contact in step S520 then a request for User D to accept User A as a contact can be sent from node 1 to a node of User D over the P2P network 106. If User D accepts the request then the node of User D will make private contact details of User D available to User A.

Returning to FIGS. 4 and 5, if in step S520 the recommended user is added as a new contact in User A's contact list, in step S522 it is decided whether the method described above should be implemented on the new contact. In other words, the new contact takes the role of User B in the method described above and mutual friends of the new contact and contacts of the new contact may be recommended to User A as new contacts. In this way, the method can be carried out in an iterative fashion as User A adds recommended users to his contact list. If in step S520 the recommended user is not added to User A's contact list then the method ends in step S524. Similarly, if in step S522 the method is not to be repeated for a new contact then the method ends in step S524.

If in step S516 it is determined that the number of occurrences of a hash value in the lists received at node 2 from the selected nodes 3, 3', 3" and 3'" does not exceed the threshold value, then the contact having a username indicated by the hash value is not recommended as a contact to User A, and the method can pass to step S526.

The number of recommendations transmitted to User A that is considered sufficient in step S518 may be relatively small (e.g. two or three) and may be limited to contacts that are mutual friends of many of the selected users. This is achieved by setting the threshold value used in step S516 to a high value (e.g. close to the total number of selected users), It is acceptable to recommend a small number of contacts to User A because if User A adds any of the recommended contacts as a new contact then the method described above can be implemented on the new contact as described in relation to step S522. It is also beneficial to set the threshold value in step S516 to a high value as this will mean that only contacts that are mutual friends of many of the selected contacts (Users C, C', C" and C'") are recommended to User A. This will reduce the number of recommendations that are made to User A for contacts that User A does not wish to add as new contacts.

However, if the search for mutual friends on the selected contacts (User C, C', C" and C'") is considered to result in too few recommendations (e.g. less than 3 recommendations) then it may be desirable to increase the number of recommendations if possible. One way to increase the number of recommendations is to reduce the threshold value used in step S516.

Another way to increase the number of recommendations is to perform an additional search for mutual friends on a different group of selected users (C, C', C" and C'") if the previous searches were not exhaustive, meaning that the contact list of user B is sufficiently large to expand the search, e.g. whether there are contacts in User B's contact list which were not included in the original group of selected users. In step S526 it is decided whether to repeat the search for mutual friends. If it is decided not to repeat the search then the method continues with step S518 in which the contacts which passed the test in step S516 (i.e. the contacts whose hash values appeared in enough of the lists received from nodes 3, 3', 3" and 3''') to reach or exceed the threshold) are recommended to User A. However, if it is decided in step S526 that a repeat search is to be performed then the method returns to step S506 wherein a different group of users is selected from User B's contact list. This different group of selected users may comprises some or none of the original group of selected users (Users C, C', C" and C'''). The method is then carried out as described above using the new group of selected users to find mutual friends of User B and the users of the new group which may be recommended to User A as a new contact, but with hash values of already found mutual contacts removed from the list sent to new group of selected nodes 3, to avoid counting in the contacts that are already considered common contacts.

In either of these ways, more contacts may be recommended to User A as new contacts.

It is clear that the selection of the users (C, C', C" and C''') in step S506 is important in determining potential contacts for recommending to User A in step S518. It is therefore beneficial to select the users in step S506 carefully, such that the most relevant recommendations are likely to be provided to User A, such that contacts are recommended that User A is likely to add as new contacts. The choice of the selected users in step S506 can be based on different criteria, depending on the information available at node 2 (112). In this way, the relevance of common contacts found for User A can be maximized, by choosing the best nodes in step S506 based on a variety of criteria available at the second node. The threshold value used in step S516 can be adjusted based on the number of, and on characteristics of, the nodes selected in step S506.

The selection of the users in step S506 may be based on a determination that a user (e.g. User C) is online and in good status (i.e. is not blocked by User B and is authorised to communicate with User B over the P2P communications network 106). It is useful to only select users that are online and capable of communicating with User B over the P2P communications network 106.

Another criterion on which the selection of the users in step S506 may be based is a determination of the number of contacts in the contact list of a user (e.g. User C), if User C has enabled his contacts to see the size of his contact list. Selecting users with a large number of contacts in their contact list will increase the likelihood of finding mutual friends.

Node 2 (112) may track the "contact relevance" of a potential selected user (e.g. User C). In other words, node 2 (112) may provide an indication of how actively User B is communicating with the potential selected user C. The number of communication events or the duration of communication events between User B and the potential selected user (e.g. User C) may be taken into account in deciding whether to select the user in step S506. In general the amount, or extent, of communication between User B and the potential selected user (e.g. User C) is taken into account in deciding whether to select the user in step S506. In this way, in step S506, users with whom User B communicates more may be more likely to be selected as users for finding mutual friends.

Another criterion on which the selection of the users in step S506 may be based is a determination of the geographical distance between node 1 and a node of the potential selected user (e.g. node 3 of User C). The selection may be based on a determination of the time zones at the nodes in the network. The difference between the time zones can be used as a crude approximation of the geographical distance between the nodes. The determination of the geographical distance or the time zone difference can be useful is selecting the users in step S506 because users that are closer to User A are more likely to be someone that User A may want to add into his contact list.

Using any or all of the criteria described above in deciding which users to select in step S506 can significantly improve the quality of the recommendations provided to User A, and can also increase the number of potential recommendations found. In other words, User A is more likely to add the recommended contacts when any or all of the criteria described above are used in deciding which users to select in step S506. Using the criteria described above is particularly useful when User B has a large number of contacts in his contact list because then the number of users that may be selected in step S506 is large. However, it must be noted that the method still produces useful recommendations to User A if random contacts of User B are selected in step S506 (i.e. if no selection criteria are used).

The method of recommending new contacts to User A is particularly useful in large P2P networks. Indeed, the method scales very well computationally to the point where the transmission of the network is the limiting factor, rather than the database operations because the database operations are carried out in parallel on the P2P nodes rather than centrally in the contact server. The functional performance of the method mainly depends on the number of contacts in User B's contact list and on the selection of the contacts (C, C', C" and C''') in step S506 that are queried. The larger the number of contacts in User B's contact list, the more contacts there are to choose from in step S506 and the higher the likelihood of a sufficient number of User B's contacts being online.

Selecting a larger number of contacts (e.g. Users C, C', C" and C''') in step S506 improves the quality of the recommendations to User A (i.e. improves the likelihood that User A will add the recommended contact as a new contact). Selecting a larger number of contacts in step S506 means that the threshold value used in step S516 can be higher, which means that the contacts recommended to User A are mutual friends of more of the selected users, and therefore more likely to also be a friend of User A.

In the preferred embodiment described above the method is performed in real time where all of the users chosen in step S506 are online simultaneously. In that case, the transmissions between nodes occur as described above directly between the nodes as shown in FIG. 4 along the direct links 402, 404, 404', 404", 404''', 406, 406', 406", 406''' and 408 of the P2P communications network 106. In particular, in the preferred embodiment described above the transmission of the list of hash values from node 2 to node 3 is a direct transmission over link 404 and the transmission of the returned list of hash values from node 3 to node 2 is a direct transmission over link 406.

In an alternative embodiment the central server connected to the P2P communications network 106 can be used to relay communication between nodes that are not simultaneously online. For example, if User B is online but User C is offline, in step S508 node 2 may transmit the generated list, intended for User C at node 3, to the central server 122 where it can be stored. Then when User C logs into the P2P system at node 3 the list stored at the central server can be transmitted to node 3. Similarly, in step S512 node 3 may transmit the list, intended for User B at node 2, to the central server where it is stored. At some point (e.g. when User B logs into the P2P system at node 2) the list stored at the central server intended for User B can be transmitted to node 2. Once responses to all, or a sufficient number of queries have been received at node 2, the algorithm of finding common contacts can be continued on node 2.

Similarly, the recommendations sent from node 2 to node 1 in step S518 may be a direct transmission over the P2P system from node 2 to node 1 using the link 408. Alternatively, node 2 may transmit the recommendations to the central server from which the recommendations can be transmitted to node 1.

Where the number of third nodes (i.e. nodes 3, 3', 3" and 3''') currently communicating in the P2P network is too small for reliable recommendations to be made, the method can proceed as described above in which a central server is used as a store-and-forward system for holding identifier lists for P2P nodes. P2P nodes can send queries to the central server as they come online and log into the P2P network. The P2P nodes can store the processing results back on the central server in case the sender of the list of identifiers is no longer online.

A preferred embodiment of the invention has been described above. However, there are alternative ways in which the invention can be put into effect. Some alternative embodiments of the invention will now be described in relation to FIGS. 7a to 9b.

Figure 7A:
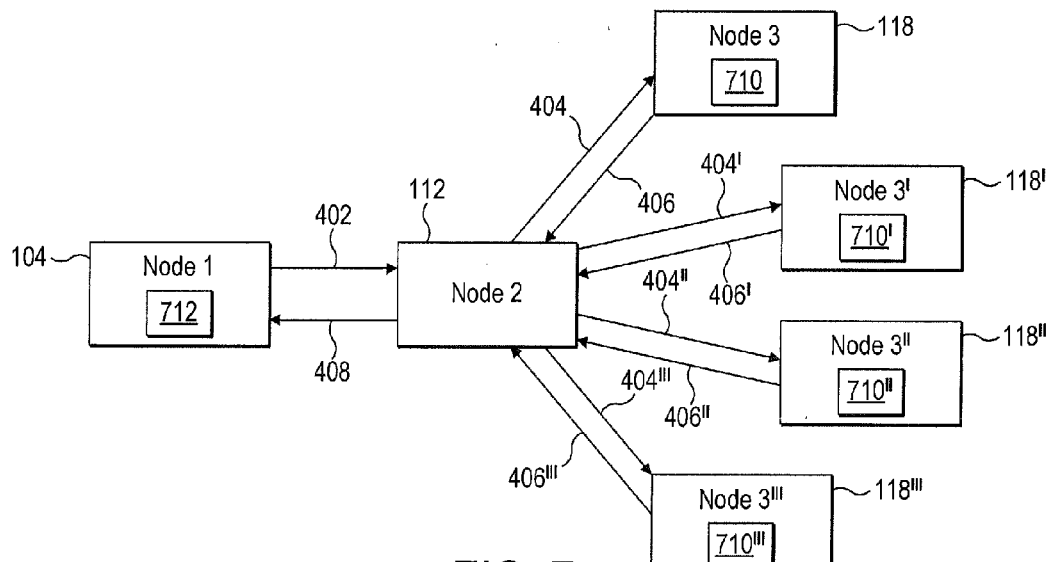
FIG. 7a is a schematic diagram of a peer to peer network according to a first alternative embodiment.
Figure 7B:
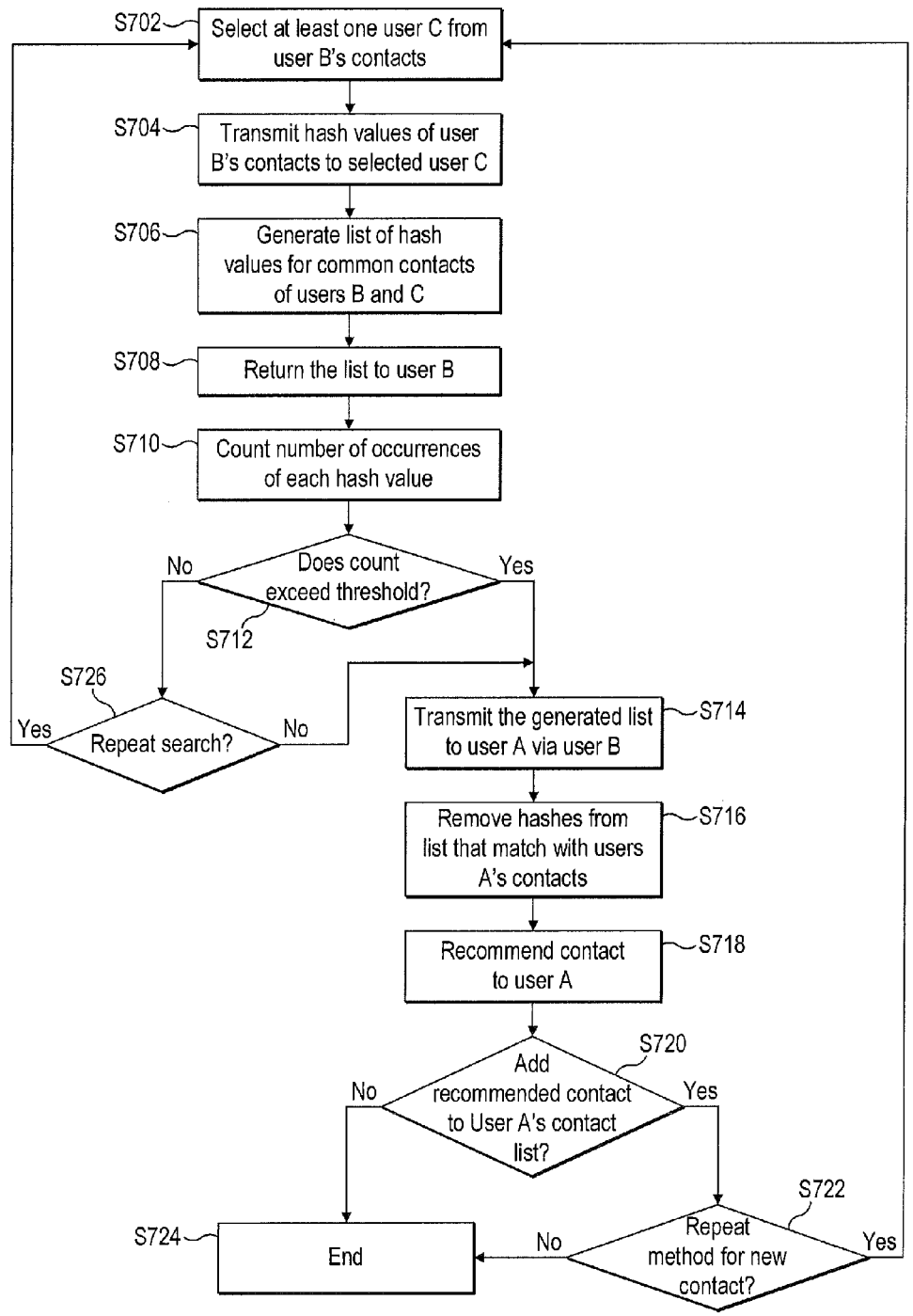
FIG. 7b shows a flowchart of a process for recommending a new contact to a user of the P2P system according to the first alternative embodiment.

A first alternative embodiment is now described with reference to FIGS. 7a and 7b. FIG. 7a shows the system of the first alternative embodiment including a first node 104, a second node 112 and third nodes 118, 118', 118" and 118''', as described above in relation to FIG. 4. The third nodes 118 to 118''' include respective comparing means 710 to 710''' and the first node 104 includes comparing means 712.

In operation, in step S702, the second node 112 selects the third users (Users C to C''') at the third nodes 118 to 118''', as described above in relation to the preferred embodiment. The third users are contacts of the second user (User B). In step S704 a list of the hash values of the second user's contacts is transmitted over the network from the second node 112 to the third nodes 118 to 118'''.

In step S706, the comparing means 710 to 710''' at the respective third nodes 118 to 118''' are used to generate respective lists of hash values of the common contacts of the second user and the respective third users, as described above in relation to the preferred embodiment. In step S708, the list of hash values is returned to the second node 112.

In step S710, the number of occurrences of each hash value in the lists returned from the third nodes 118 to 118''' is counted at the second node 112, as described above in relation to the preferred embodiment. It is determined in step S712 whether the number of occurrences of a particular hash value exceeds a threshold, and if so, the method proceeds with step S714. In step S714 the hash values which exceed the threshold in step S712 form a list of hash values which is transmitted over the network from the second node 112 to the first node 104. In step S716 the hash values received from the second node 112 are compared with hash values of the contacts of the first user (User A) at the first node 104. Hash values indicating contacts of the first user are removed from the list of hash values received from the second node, which leaves a list of hash values indicating contacts which are contacts of the second user and contacts of at least one of the third users but which are not already contacts of the first user. In step S718 at least one of the remaining hash values indicates a contact which is recommended as a new contact to the first user.

In step S720 it is determined whether to add the recommended contact as a new contact for the first user. If the recommended contact is added as a new contact then in step S722 it is determined whether the method should be repeated for the new contact, and if so, the method passes back to step S702. If it is determined that the method should not be repeated for the new contact then the method ends in step S724. If the result of step S720 is negative then the method ends in step S724.

If in step S712 it is determined in step S712 that the count does not exceed the threshold then in step S726 it is determined whether to repeat the search, as described above in relation to the preferred embodiment. If it is decided not to repeat the search then the method continues with step S714 in which the contacts which passed the test in step S712 are recommended to User A. However, if it is decided in step S726 that a repeat search is to be performed then the method returns to step S702 wherein a different group of users is selected from User B's contact list.

Figure 8A:
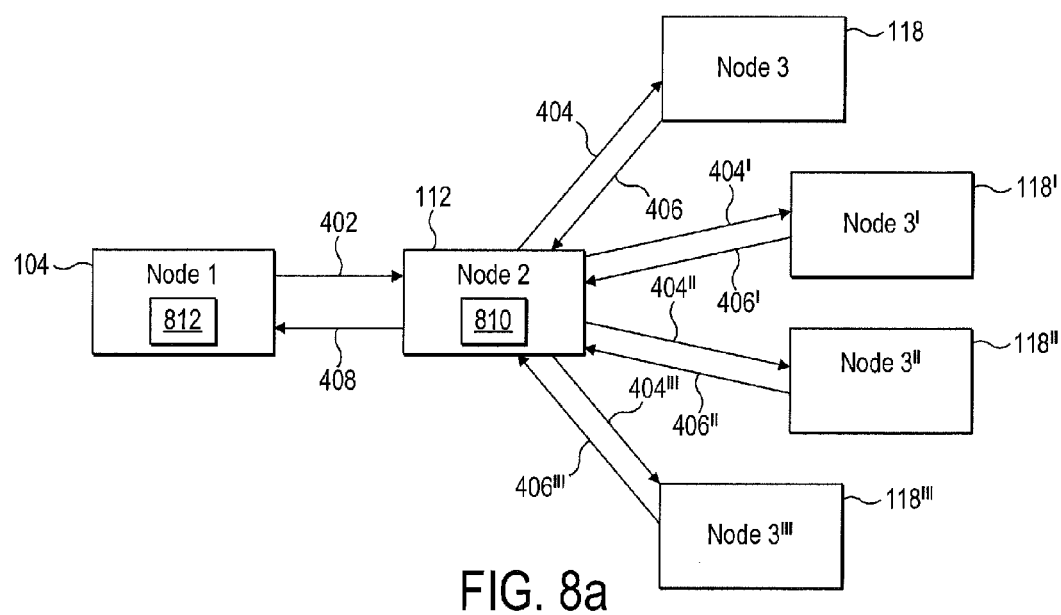
FIG. 8a is a schematic diagram of a peer to peer network according to a second alternative embodiment.
Figure 8B:
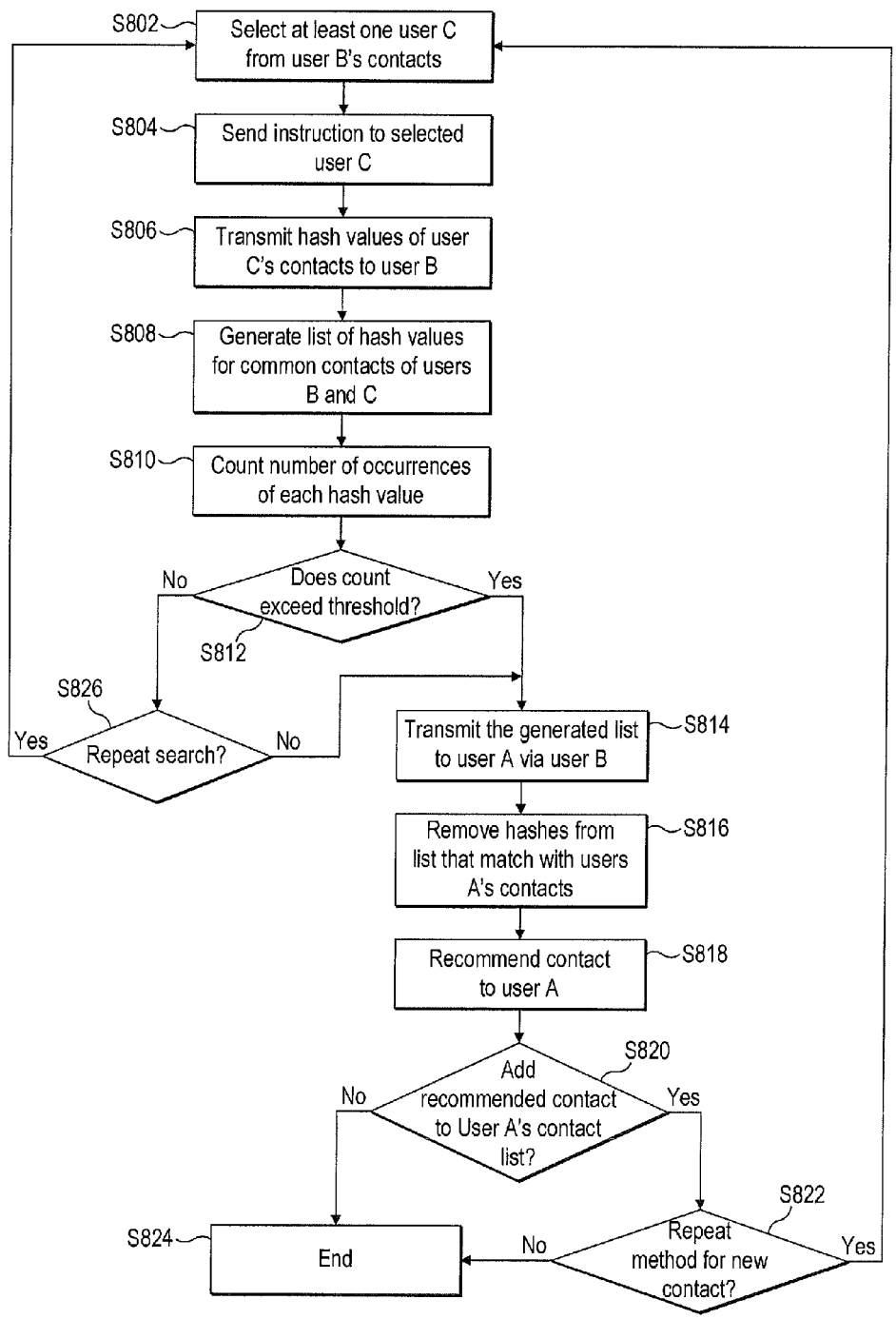
FIG. 8b shows a flowchart of a process for recommending a new contact to a user of the P2P system according to the second alternative embodiment.

A second alternative embodiment is now described with reference to FIGS. 8a and 8b. FIG. 8a shows the system of the second alternative embodiment including a first node 104, a second node 112 and third nodes 118, 118', 118" and 118''', as described above in relation to FIG. 4. The second node 112 includes comparing means 810 and the first node 104 includes comparing means 812.

In operation, in step S802, the second node 112 selects the third users at the third nodes 118 to 118''' as described above in relation to the preferred embodiment. The third users are contacts of the second user. In step S804 an instruction is transmitted over the network from the second node 112 to the third nodes 118 to 118''' instructing the third nodes 118 to 118''' to transmit lists of hash values indicating the contacts of the users at the respective third nodes 118 to 118'''. In step S806, the third nodes 118 to 118''' transmit hash values indicating the contacts of the users at the respective third nodes 118 to 118''' to the second node 112.

In step S808 the comparing means 810 at the second node 112 is used to generate respective lists of hash values of the common contacts of the second user and the respective third users, as described above in relation to the preferred embodiment.

In step S810, the number of occurrences of each hash value in the lists is counted at the second node 112, as described above in relation to the preferred embodiment. It is determined in step S812 whether the number of occurrences of a particular hash value exceeds a threshold, and if so, the method proceeds with step S814. In step S814 the hash values which exceed the threshold in step S812 form a list of hash values which is transmitted over the network from the second node 112 to the first node 104. In step S816 the hash values received from the second node 112 are compared with hash values of the contacts of the first user at the first node 104. Hash values indicating contacts of the first user are removed from the list of hash values received from the second node, which leaves a list of hash values indicating contacts which are contacts of the second user and contacts of at least one of the third users but which are not already contacts of the first user. In step S818 at least one of the remaining hash values indicates a contact which is recommended as a new contact to the first user.

In step S820 it is determined whether to add the recommended contact as a new contact for the first user. If the recommended contact is added as a new contact then in step S822 it is determined whether the method should be repeated for the new contact, and if so, the method passes back to step S802. If it is determined that the method should not be repeated for the new contact then the method ends in step S824. If the result of step S820 is negative then the method ends in step S824.

If in step S812 it is determined in step S812 that the count does not exceed the threshold then in step S826 it is determined whether to repeat the search, as described above in relation to the preferred embodiment. If it is decided not to repeat the search then the method continues with step S814 in which the contacts which passed the test in step S812 are recommended to User A. However, if it is decided in step S826 that a repeat search is to be performed then the method returns to step S802 wherein a different group of users is selected from User B's contact list.

Figure 9A:
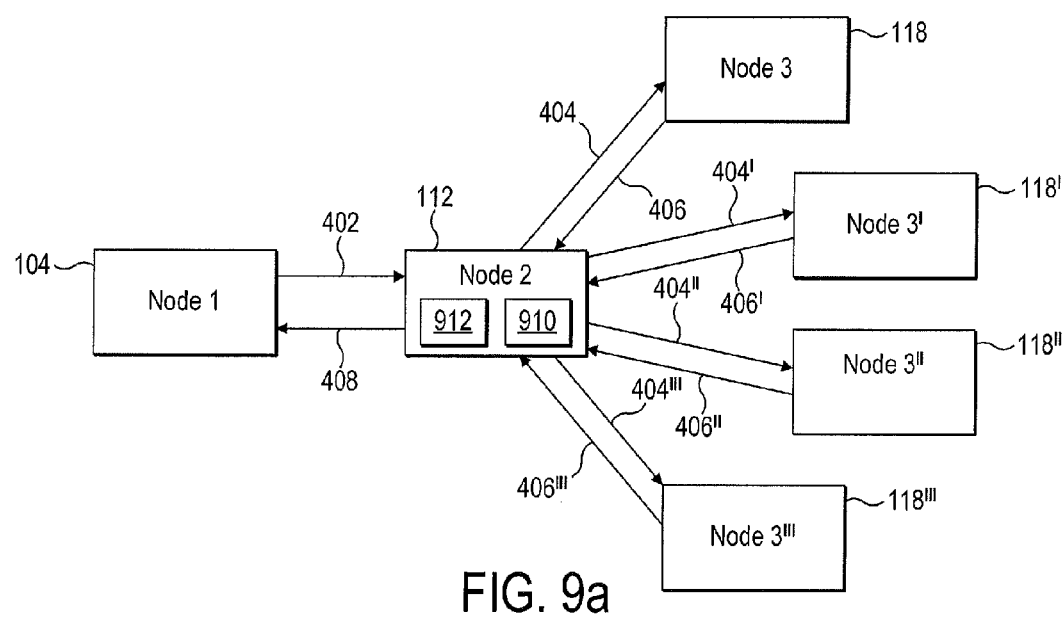
FIG. 9a is a schematic diagram of a peer to peer network according to a third alternative embodiment.
Figure 9B:
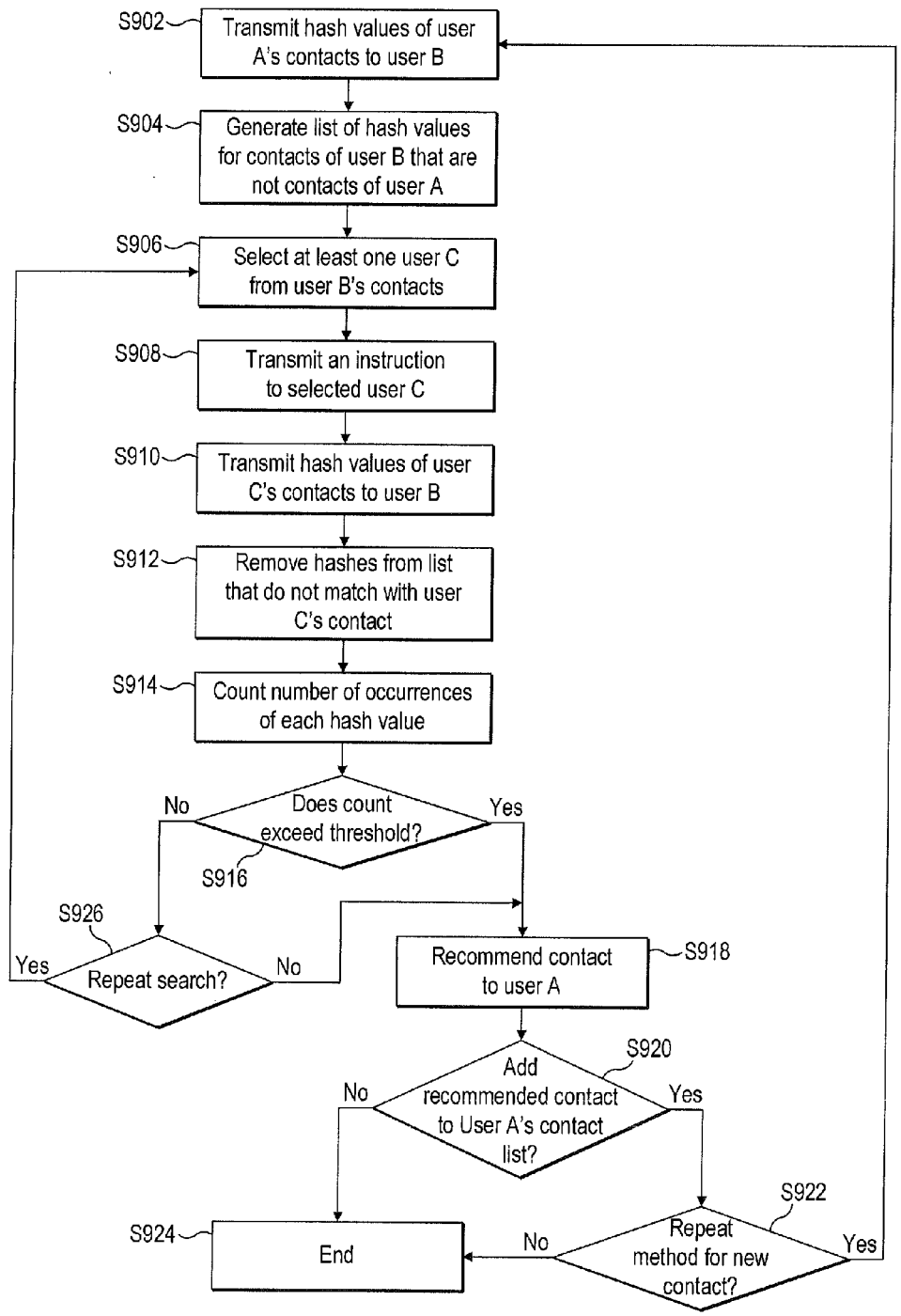
FIG. 9b shows a flowchart of a process for recommending a new contact to a user of the P2P system according to the third alternative embodiment.

A third alternative embodiment is now described with reference to FIGS. 9a and 9b. FIG. 9a shows the system of the third alternative embodiment including a first node 104, a second node 112 and third nodes 118, 118', 118" and 118''', as described above in relation to FIG. 4. The second node 112 includes comparing means 910 and comparing means 912.

In operation, in step S902 hash values indicating the first user's contacts are transmitted from the first node 104 to the second node 112 over the network. In step S904 the second node uses comparing means 910 to generate a list of hash values of the second user which are not contacts of the first user as described above in relation to the preferred embodiment.

In step S906, the second node 112 selects the third users at the third nodes 118 to 118''', as described above in relation to the preferred embodiment. The third users are contacts of the second user. In step S908 an instruction is transmitted over the network from the second node 112 to the third nodes 118 to 118''' instructing the third nodes 118 to 118''' to transmit lists of hash values indicating the contacts of the users at the respective third nodes 118 to 118" In step S910, the third nodes 118 to 118''' transmit hash values indicating the contacts of the users at the respective third nodes 118 to 118''' to the second node 112.

In step S912 the comparing means 912 at the second node 112 is used to generate respective lists of hash values of the common contacts of the second user and the respective third users, as described above in relation to the preferred embodiment.

The comparing means 912 also uses the output of the comparing means 910 to create a list of hash values indicating the common contacts of the second and third users which are not contacts of the first user. One way to implement the method is to first find the common contacts of the second and third users and then those common contacts that are also contacts of the first user can be removed. Another way to implement the method is to first find contacts of the second user which are not contacts of the first user and then to remove those contacts which are not also contacts of the third user.

In step S914, the number of occurrences of each hash value in the lists is counted at the second node 112, as described above in relation to the preferred embodiment. It is determined in step S916 whether the number of occurrences of a particular hash value exceeds a threshold, and if so, the method proceeds with step S918. In step S918 at least one of the hash values which exceeds the threshold in step S916 indicates a contact which is recommended as a new contact to the first user.

In step S920 it is determined whether to add the recommended contact as a new contact for the first user. If the recommended contact is added as a new contact then in step S922 it is determined whether the method should be repeated for the new contact, and if so, the method passes back to step S902. If it is determined that the method should not be repeated for the new contact then the method ends in step S924. If the result of step S920 is negative then the method ends in step S924.

If in step S916 it is determined in step S916 that the count does not exceed the threshold then in step S926 it is determined whether to repeat the search, as described above in relation to the preferred embodiment. If it is decided not to repeat the search then the method continues with step S918 in which the contacts which passed the test in step S916 are recommended to User A. However, if it is decided in step S926 that a repeat search is to be performed then the method returns to step S906 wherein a different group of users is selected from User B's contact list.

All of the embodiments of the invention described above allow for common contacts of the second user (at node 112) and at least one of the third users (at nodes 118 to 118''') which are not already contacts of the first user (at node 104) to be recommended as a new contact for the first user. The computation is performed at comparing means which are located at the nodes, rather than at a central database. In the various embodiments, the comparing means are located at different ones of the nodes in the system, but the overlying principle that the computation should be performed at the user nodes themselves is shown in each of the embodiments described above.

While this invention has been particularly shown and described with reference to preferred embodiments, it will be understood to those skilled in the art that various changes in form and detail may be made without departing from the scope of the invention as defined by the appendant claims. For example, it will be appreciated that embodiments of the invention described herein can be employed in any P2P system where communication client software is used by uniquely identified human users, such as an IM system, a VoIP system, a video call system or any combination thereof. The user terminals (104, 112, 118) on which the communication client is running can connect to the communication network 106 via intermediate networks (such as mobile networks, WLAN networks or corporate networks).

What is claimed is:

1. One or more computer-readable hardware storage media having computer-readable instructions which, when executed, implement a method of transmitting contact data in a peer to peer communications network, the method comprising:

processing, at a first contact store, the contact data, with a mathematical operation, a total number of key values produced by the mathematical operation being at least an order of magnitude less than a total number of users in the peer to peer communications network, to provide a degree of privacy for the contact data, to produce a first processed list of contacts comprising contact identifiers which identify contacts in the network, without transmitting any of the contact data;

transmitting the first processed list of contacts from the first contact store to a first comparator;

at the first comparator, comparing the first processed list of contacts from the first contact store with a second processed list of contacts from a second contact store, the second processed list of contacts having been produced by processing, at the second contact store, the contact data in the second contact store with the mathematical operation, to identify common contacts between the lists of contacts from the first and second contact stores, the first comparator outputting a contacts result based on the identification of the common contacts;

at a second comparator, comparing the contacts result output from the first comparator with a third processed list of contacts from a third contact store, the third processed list of contacts having been produced by processing, at the third contact store, the contact data in the third contact store with the mathematical operation; and using an output of the second comparator to identify at least one contact to recommend as a new contact to a recommendee user in the network, wherein the first contact store is at a node of the network and the first comparator is at another node of the network, and the first processed list of contacts transmitted from the first contact store is transmitted over the network to the first comparator.

2. One or more computer-readable hardware storage media having computer-readable instructions which, when executed, implement the method of claim 1, wherein the mathematical operation comprises generating hash values from the contact data.

3. One or more computer-readable hardware storage media having computer-readable instructions which, when executed, implement the method of claim 1 wherein:

the first contact store is at a first node in the network, the first node being usable by the recommendee user, the second contact store is at a second node in the network, the third contact store is at a third node in the network, the first comparator is at the second node, the second comparator is at a third node, the method further comprising:

transmitting the contacts result from the second node over the network to the second comparator at the third node, the contacts result comprising a plurality of contacts which are contacts in the second contact store which are not contacts in the first contact store, wherein the output of the second comparator is a list of contacts which are common contacts of the second and third contact stores but which are not contacts in the first contact store.

4. One or more computer-readable hardware storage media having computer-readable instructions which, when executed, implement the method of claim 3 wherein the first contact store stores contacts of the recommendee user, the second contact store stores contacts of a second user of the second node, and the third contact store stores contacts of a third user of the third node, and wherein the third user is a contact of the second user.

5. One or more computer-readable hardware storage media having computer-readable instructions which, when executed, implement the method of claim 4 further comprising selecting the third user from the contacts of the second user based on at least one of the following criteria:

a determination that the third user is logged into the peer to peer communications network at the third node and that the third user is authorized to communicate with the second user;

the number of contacts of the third user;

an indication of the extent of communication occurring between the second user and the third user;

the geographical location of the second and third nodes; and the time zones of the second and third nodes.

6. One or more computer-readable hardware storage media having computer-readable instructions which, when executed, implement the method of claim 4 wherein the method is initiated when the second user is added as a contact of the first user.

7. One or more computer-readable hardware storage media having computer-readable instructions which, when executed, implement the method of claim 3 further comprising:

transmitting the contacts result over the network to at least one further node of the network, a respective at least one further user of the at least one further node being a contact of the second user;

using the contacts result at the at least one further node to determine a respective at least one results list of contacts of the second user which are also contacts of the respective at least one further user but which are not contacts of the first user;

transmitting the at least one results list to the second node over the network; and using the output of the second comparator and the at least one results list to identify the at least one contact to recommend as a new contact for the recommendee user.

8. One or more computer-readable hardware storage media having computer-readable instructions which, when executed, implement the method of claim 7 further comprising counting the number of times that each contact occurs in the output of the second comparator and the at least one results list, wherein the at least one contact to be recommended as a new contact for the recommendee user is identified based on the count.

9. One or more computer-readable hardware storage media having computer-readable instructions which, when executed, implement the method of claim 8 wherein a contact is identified if the count for the contact exceeds a variable threshold.

10. One or more computer-readable hardware storage media having computer-readable instructions which, when executed, implement the method of claim 9 further comprising adjusting the variable threshold based on the number of said further nodes and on characteristics of the third node and of the at least one further node.

11. One or more computer-readable hardware storage media having computer-readable instructions which, when executed, implement the method of claim 3 further comprising:

generating the contacts result at the first comparator by removing, from said list of contacts from the second contact store, the identified common contacts between the lists of contacts from the first and second contact stores.

12. One or more computer-readable hardware storage media having computer-readable instructions which, when executed, implement the method of claim 11 further comprising: generating the output of the second comparator by removing from the contacts result those contacts that are not contacts of the third user.

13. One or more computer-readable hardware storage media having computer-readable instructions which, when executed, implement the method of claim 4 wherein the transmission of the contacts result over the network to the third node is from the second node directly, and wherein the output of the second comparator is transmitted over the network directly to the second node from the third node.

14. One or more computer-readable hardware storage media having computer-readable instructions which, when executed, implement the method of claim 3 wherein the transmission of the contacts result over the network to the third node is from the second node via a central server of the network, and wherein the output of the second comparator is transmitted over the network to the second node from the third node via a central server of the network.

15. One or more computer-readable hardware storage media having computer-readable instructions which, when executed, implement the method of claim 14 further comprising:

transmitting queries from the second node over the communications network to the central server for retrieving the output of the second comparator when the second node logs into the communications network; and transmitting queries from the third node over the communications network to the central server for retrieving the contacts result when the third node logs into the communications network.

16. One or more computer-readable hardware storage media having computer-readable instructions which, when executed, implement the method of claim 1 wherein the method is initiated by a search request from the first user at the first node.

17. One or more computer-readable hardware storage media having computer-readable instructions which, when executed, implement the method of claim 1 wherein:
the first contact store is at a second node in the network,
the second contact store is at a third node in the network,
the third contact store is at a first node in the network, the first node being usable by the recommendee user,
the first comparator is at the third node,
the second comparator is at the first node, the method further comprising:
transmitting the contacts result from the third node over the network to the second comparator at the first node via the second node, the contacts result comprising a plurality of contacts which are common contacts of the first and second contact stores,
wherein the output of the second comparator is a list of contacts which are common contacts of the first and second contact stores but which are not contacts in the third contact store.

18. One or more computer-readable hardware storage media having computer-readable instructions which, when executed, implement the method of claim 1 wherein:
the first contact store is at a third node in the network,
the second contact store is at a second node in the network,
the third contact store is at a first node in the network, the first node being usable by the recommendee user,
the first comparator is at the second node,
the second comparator is at the first node, the method further comprising:
transmitting the contacts result from the second node over the network to the second comparator at the first node, the contacts result comprising a plurality of contacts which are common contacts of the first and second contact stores,
wherein the output of the second comparator is a list of contacts which are common contacts of the first and second contact stores but which are not contacts in the third contact store.

19. One or more computer-readable hardware storage media having computer-readable instructions which, when executed, implement the method of claim 1 wherein:
the first contact store is at a third node in the network,
the second contact store is at a second node in the network,
the third contact store is at a first node in the network, the first node being usable by the recommendee user,
the first comparator is at the second node,
the second comparator is at the second node,
the method further comprising: transmitting a list of contacts of the third contact store from the first node over the network to the second comparator at the second node,
wherein the contacts result from the first comparator comprises a plurality of contacts which are common contacts of the first and second contact stores,
and wherein the output of the second comparator is a list of contacts which are common contacts of the first and second contact stores but which are not contacts in the third contact store.

20. A peer to peer communications network comprising:
a first central processing unit executing a first comparator that receives a list of contacts, the list having been processed with a mathematical operation, a total number of key values produced by the mathematical operation being at least an order of magnitude less than a total number of users in the peer to peer communications network, to provide a degree of privacy for the contact data, from contact data to produce a first processed list of contacts comprising contact identifiers, transmitted over a network from a first contact store and to compare the first processed list of contacts with a second processed list of contacts from a second contact store, the second processed list of contacts having been produced by processing with the mathematical operation, to identify common contacts between the lists of contacts from the first and second contact stores, the first comparator further configured to output a contacts result based on the identification of the common contacts; and
a second central processing unit executing a second comparator that compares the contacts result output from the first comparator with a third processed list of contacts from a third contact store, the third processed list of contacts having been produced by processing with the mathematical operation;
wherein an output of the second comparator is used to identify at least one contact to recommend as a new contact to a recommendee user in the network,
and wherein the first contact store is at a node of the network and the first comparator is at another node of the network, and the list of contacts transmitted from the first contact store is transmitted over the network to the first comparator.

21. The network of claim 20 wherein:
the first contact store is at a first node in the network, the first node being usable by the recommendee user,
the second contact store is at a second node in the network,
the third contact store is at a third node in the network,
the first comparator is at the second node,
the second comparator is at the third node,
and wherein the contacts result output from the first comparator comprises a plurality of contacts which are contacts in the second contact store which are not contacts in the first contact store, the contacts result being transmitted over the network from the second node to the second comparator at the third node,
and wherein the output of the second comparator is a list of contacts which are common contacts of the second and third contact stores but which are not contacts in the first contact store.

22. The network of claim 20 wherein:
the first contact store is at a second node in the network,
the second contact store is at a third node in the network,
the third contact store is at a first node in the network, the first node being usable by the recommendee user,
the first comparator is at the third node,
the second comparator is at the first node,
and wherein the contacts result output from the first comparator comprises a plurality of contacts which are common contacts of the first and second contact stores, the common contacts of the first and second contact stores being transmitted over the network from the third node to the second comparator at the first node via the second node, and wherein the output of the second comparator is a list of contacts which are common contacts of the first and second contact stores but which are not contacts in the third contact store.

23. The network of claim 20 wherein:

the first contact store is at a third node in the network, the second contact store is at a second node in the network, the third contact store is at a first node in the network, the first node being usable by the recommendee user, the first comparator is at the second node, the second comparator is at the first node, and wherein the contacts result output from the first comparator comprises a plurality of contacts which are common contacts of the first and second contact stores, the common contacts of the first and second contact stores being transmitted over the network from the second node to the second comparator at the first node, and wherein the output of the second comparator is a list of contacts which are common contacts of the first and second contact stores but which are not contacts in the third contact store.

24. The network of claim 20 wherein:

the first contact store is at a third node in the network, the second contact store is at a second node in the network, the third contact store is at a first node in the network, the first node being usable by the recommendee user, the first comparator is at the second node, the second comparator is at the second node, and wherein the contacts result output from the first comparator comprises a plurality of contacts which are common contacts of the first and second contact stores, and wherein the first node is configured to transmit a list of contacts of the third contact store over the network to the second comparator at the second node, and wherein the output of the second comparator is a list of contacts which are common contacts of the first and second contact stores but which are not contacts in the third contact store.

* * * * *